US010167942B2

(12) United States Patent
Zampollo

(10) Patent No.: US 10,167,942 B2
(45) Date of Patent: Jan. 1, 2019

(54) SPEED REDUCING EQUIPMENT WITH TORQUE SPLITTER, AND CASING THEREOF

(75) Inventor: Jorge Luiz Zampollo, Ribeirao Preto (BR)

(73) Assignee: Renk Zanini S/A Equipamentos Industrials, Cravinhos (BR)

(*) Notice: Subject to any disclaimer, the term of this patent is extended or adjusted under 35 U.S.C. 154(b) by 241 days.

(21) Appl. No.: 14/350,247

(22) PCT Filed: May 28, 2012

(86) PCT No.: PCT/BR2012/000158
§ 371 (c)(1),
(2), (4) Date: Apr. 7, 2014

(87) PCT Pub. No.: WO2013/071380
PCT Pub. Date: May 23, 2013

(65) Prior Publication Data
US 2014/0283644 A1    Sep. 25, 2014

(30) Foreign Application Priority Data

Nov. 17, 2011 (BR) .................................... 1102093

(51) Int. Cl.
*F16H 57/02* (2012.01)
*F16H 57/04* (2010.01)

(52) U.S. Cl.
CPC ......... *F16H 57/02* (2013.01); *F16H 57/0424* (2013.01); *F16H 57/0445* (2013.01);
(Continued)

(58) Field of Classification Search
CPC ........ F03D 15/00; F16H 57/02; F16H 57/021; F16H 57/028; F16H 57/0424;
(Continued)

(56) References Cited

U.S. PATENT DOCUMENTS 1,480,566 A * 1/1924 Parsons ..................... F16H 1/06
74/410
1,902,934 A * 3/1933 Acker ....................... F16H 1/16
29/898.1
(Continued)

FOREIGN PATENT DOCUMENTS

CA     1077747 A1    5/1980
CN     102182816 A   9/2011
(Continued)

OTHER PUBLICATIONS

Define bushing—Google Search, google.com., Jun. 5, 2016.*
(Continued)

*Primary Examiner* — Vinh Luong
(74) *Attorney, Agent, or Firm* — Troutman Sanders LLP; Ryan A. Schneider

(57) ABSTRACT

Speed reducing equipment with a torque splitter, and casing used in all types of industrial plants for processing organic or inorganic raw materials. The speed reducer with torque splitting includes four metallic overlapping casing parts having three joint faces between the overlapping casing parts, the three joint faces parallel and horizontals and passing through shaft center lines of a rotating system containable within the casing.

15 Claims, 18 Drawing Sheets

(52) U.S. Cl.
CPC .............. *F16H 2057/02008* (2013.01); *F16H 2057/02073* (2013.01); *Y10T 74/2186* (2015.01)

(58) Field of Classification Search
CPC ....... F16H 2057/02008; F16H 57/0412; F01C 21/104; B60Y 2200/415
USPC ........................................................ 74/606 R
See application file for complete search history.

(56) References Cited

U.S. PATENT DOCUMENTS

| | | | | |
|---|---|---|---|---|
| 2,081,846 | A | * | 5/1937 | Behrens .................. F16H 3/091 74/359 |
| 2,823,558 | A | * | 2/1958 | Semar .................... B63H 23/00 74/410 |
| 3,654,815 | A | * | 4/1972 | Dehne ..................... F16H 1/22 74/410 |
| 3,760,654 | A | * | 9/1973 | Fisher ..................... F16H 37/00 74/410 |
| 3,969,956 | A | * | 7/1976 | Hanslik ............... B29C 47/0801 366/100 |
| 4,022,083 | A | * | 5/1977 | Pollak-Banda ....... F16H 57/022 74/606 R |
| 5,207,121 | A | * | 5/1993 | Bien ........................ B61C 9/38 74/606 R |
| 6,202,507 | B1 | | 3/2001 | Phillips |
| 6,408,667 | B1 | * | 6/2002 | de Jesus, Jr. ......... B21B 31/103 29/401.1 |
| 2005/0011307 | A1 | * | 1/2005 | Gmirya .................. B64C 27/12 74/665 GA |
| 2006/0156861 | A1 | * | 7/2006 | Yamasaki ........... F16H 57/0006 74/606 R |
| 2009/0044649 | A1 | * | 2/2009 | Bouche ................. F16H 57/033 74/421 R |
| 2009/0092462 | A1 | * | 4/2009 | Pratt ..................... F16B 13/063 411/368 |
| 2011/0222801 | A1 | * | 9/2011 | Connell ................ F16B 5/0225 384/40 |
| 2013/0089388 | A1 | * | 4/2013 | Liu ........................ F16B 43/02 411/371.2 |
| 2013/0315707 | A1 | * | 11/2013 | Spanel .................... F04D 17/12 415/67 |
| 2014/0050550 | A1 | * | 2/2014 | Stempniewski ...... F16B 13/065 411/360 |
| 2016/0281838 | A1 | * | 9/2016 | Wu ........................ F16H 57/03 |

FOREIGN PATENT DOCUMENTS

| | | | |
|---|---|---|---|
| EP | 3061991 A1 | * | 8/2016 |
| WO | WO 2006/105809 A1 | * | 10/2006 |
| WO | WO 2014/121904 A1 | * | 8/2014 |
| WO | WO 2016/062549 A1 | * | 4/2016 |

OTHER PUBLICATIONS

Define spur pinion shaft—Google Search, google.com., Jun. 5, 2016.*
Define washer—Google Search, google.com., Jun. 5, 2016.*
Define inlet pinion shaft—Google Search, google.com., Jun. 13, 2018. (Year: 2018).*
Define intermediary shaft—Google Search, google.com., Jun. 13, 2018. (Year: 2018).*
International Search Report dated Jun. 18, 2012 for priority application PCT/BR2012/000158.

* cited by examiner

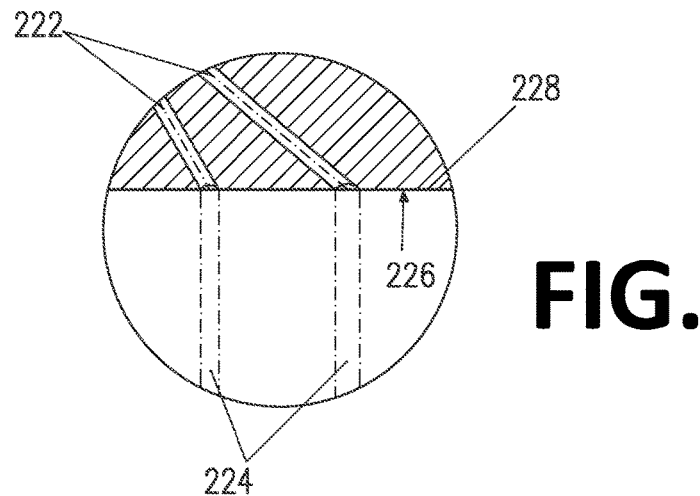
FIG. 9
FIG. 10A
FIG. 10B
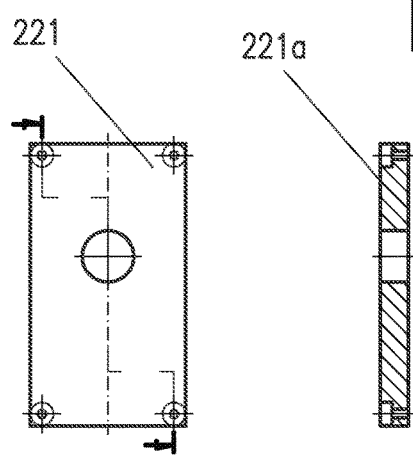

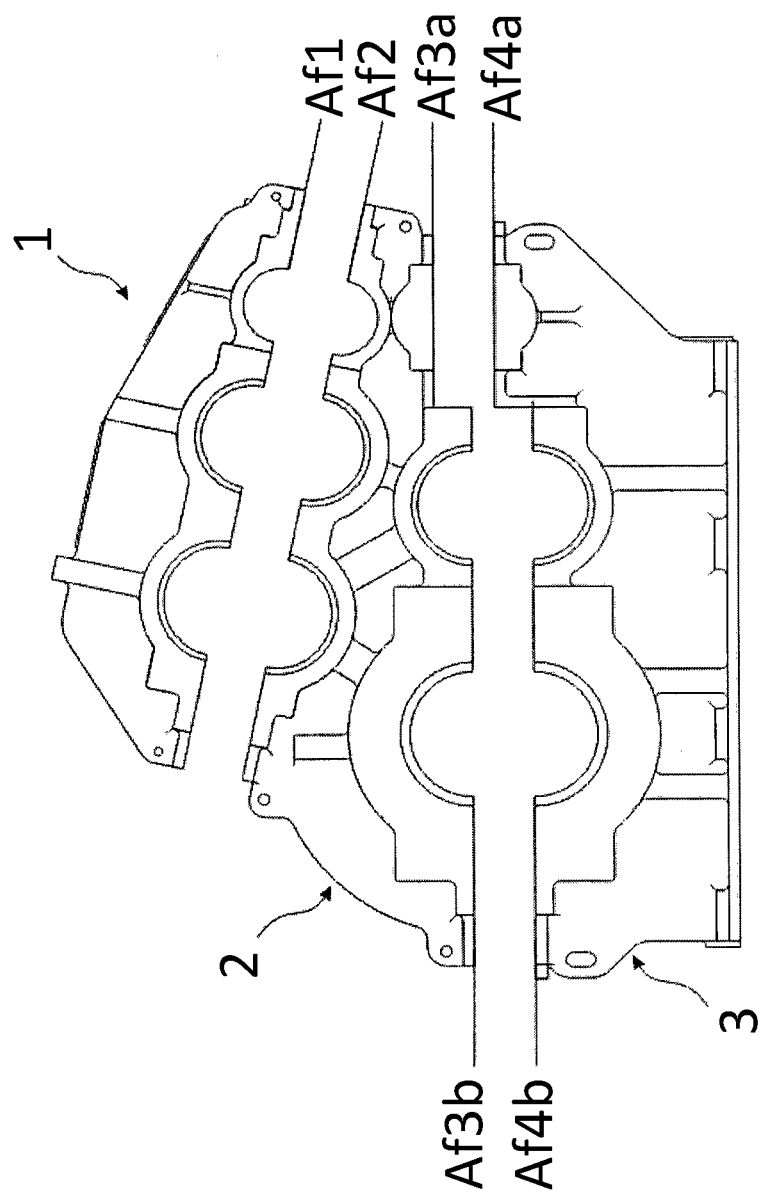

US 10,167,942 B2

SPEED REDUCING EQUIPMENT WITH TORQUE SPLITTER, AND CASING THEREOF

CROSS REFERENCE TO RELATED APPLICATIONS

This application is a US National Stage of International Application No. PCT/BR2012/000158, filed 28 May 2012, which claims the benefit of BR C1 1102093-8, filed 17 Nov. 2011, all herein fully incorporated by reference.

BACKGROUND OF THE INVENTION

1. Field of the Invention

The present patent of invention on the above title and description object and claim in this record is an evolutionary solution, meeting specific application in equipment like speed reducer with torque splitter, applied in all sorts of industrial facility such as processing plants of sugarcane, cement plants, mining deposits among other applications that somehow requires the use of this type of equipment for its operation to be feasible and productive.

2. Description of Related Art

In view of the industry and trade of the equipment like speed reducer with torque splitter, it is known by the field experts of the Sugar and Alcohol Industry, for example, that installation of industrial equipment such as mills that make up a processing plant of sugarcane, require either predictive as corrective maintenance procedures, where this condition occurs due to the harsh conditions to which the equipment are exposed, either by the constant mechanical force applied continuously to the equipment, but also by the action of corrosion along the mechanical parts, notably the parts that develop some kind of kinematics, because such equipment process the material characterized by high levels of acidity and moisture (sugarcane, cement, certain types of mining, chemical industry, among others).

Given this critical operational condition of the raw materials processing units with high acid and moisture value, the equipment manufacturer for industrial plants previously cited coexist with ongoing challenge of ensuring reliability thereof, with reduced downtime for maintenance interventions since such facilities are only economically viable because it must ensure a continuous production process, without interruptions, that for inorganic matter processing (in the exploitation of deposits) and also to organic materials (such as in the sugarcane processing), and being this specific case, such industrial plants (mills) should be operating full time during the harvest period of the crop of sugarcane.

According to what was explained in the previous paragraphs, the inventor, anchored to torque reducer equipment technology expertise, sees a need to adapt their equipment to the condition of ensuring the continued productivity of raw materials industrial plants either in organic nature as inorganic nature, in such a way that adds value to the said equipment in order to give this a differentiated ease of assembly/disassembly, maximum longevity possible concerning to critical conditions to which it is exposed when in an operational state, as well as gains in productivity, and also consequent reduction in the manufacturing cost of the speed reducer equipment with torque splitter, which reflects in the reduction of industrial cost of said industrial plant.

Under the Industrial Optics:

bearing in mind the industry and trade of equipment like speed reducer with torque splitter, know the expert to the embedded technology that is increasingly imperative to make its manufacturing cost as low as possible.

Under the Maintenance Optics:

bearing in mind the sugar and alcohol industry, for example, where the equipment of its industrial installation such as millings or diffusers (which make up a sugarcane processing plant) require predictive, preventive and corrective maintenance procedures, potentialized by the high mechanical forces applied to the equipment, there is a pressing need to give differentiated ease in disassembly procedure and subsequent assembly of the reducer equipment when in the field.

BRIEF SUMMARY OF THE INVENTION

According to what the topic demand of the invention disclosed, the applicant elected as development paradigm certain components parts of the conventional speed reducer with torque splitter equipment, i.e., commonly marketed so far, which are listed below:

1. Speed reducer casing;
2. Assembly system of the speed reducer casing;
3. Rotating system of the speed reducer;
4. Hydraulic system of the speed reducer;
5. Attachment system of the speed reducer in the industrial plant foundation.

In line with the demand and the invention paradigm the applicant idealized new "improvements introduced to speed reducer equipment and casing thereof" provided with the novelty associated with inventive activity because do not arise so obvious or clear other solutions known in the prior art to this type of equipment.

In addition the "invention" is provided with industrial applicability, being economically viable and, therefore, meeting the patentability requirements rigor, notably as patent of invention, as provided in the dictates of Articles 8 and 13 of the Law 9279.

In order to provide veracity, and consolidating the context disclosed on topics of the introductory set, an explanation will be presented about the state of the art dictated by solutions developed and widely used for speed reducer with torque splitter equipment, where after critical analysis of these solutions once exposed professionals with expertise relevant to this type of equipment may identify their limiting aspects, thus consolidating the identification of demands needs for unprecedented improvements.

The technological basis for speed reducer equipment is based on a rotating system consisting of pinions and gears, which ensures the function of "providing speed reduction" and consequent torque multiplication, being that such mechanism is assembled on a casing, where this group formed by casing+rotating system is fixed directly on the foundation of any industrial installation, especially in industrial plants to process organic or inorganic raw materials.

In turn, into this technological base shown in the previous paragraph the inventor elects three major subsystems that will be the study object and critical analysis with identification of its potential problems and further the cause of these problems, described below:

1. Casing:
   1a. Constructive concept: based on a split casing, with joint faces, being further provided that internal split blocks that comprise the bearings bores which are fixed to the casing by welding process, where a significant event of that constructiveness is that the bearings are not supported by stiff walls of the speed reducer casing.

1b. Problems identification: although this constructive concept of the "conventional casing" or "bipartite" component presents functional effectiveness, it holds a series of negatives aspects, among which is explicit on the optical technique the occurrence of undesirable vibration of mechanical components such as pinions, gears and bearings, the problem of its high production cost, this in turn due to the high amount of material and machining time processing. Over the assembly optic, there is a high demand of time (man-time) to assemble the set "casing+rotating system+bearings".

1c. Problem cause: the careful observation of the casing constructive concept discloses that the progressive vibration of the speed reducer set with torque splitter occurs by the fact that its split structure gives low structural stiffness for the bearings generating its premature wear and consequent occurrence of clearances in the mechanical assembly set inside thereof.

2. Assembly System of the Casing:

2a. Constructive concept: based on the use of machined threaded bars in high alloy steel and with normal pitch, being still expected the threaded bar is assembled and fixed by means of standard washers;

2b. Problems identification: occurrence, when the equipment is already in field and operational, of fatigue fracture of threaded bars;

2c. Problem cause: the threaded bar component is subjected to cyclic loads, with occurrence of overloads and high loading fluctuations in the application. Furthermore when the speed reducer with torque splitter is in the operating condition the casing component undergoes deformation, especially cyclic deformation imposing flexion stress over the upper part of the threaded bar components.

3. Rotating System of the Speed Reducer.

3a. Constructive concept: based on the set of gears, pinion and helical gear in the previous stage to the torque splitter, and bi-helical pinion with different helix angle in the stage torque splitter per se. From the functional concept, it is mandatory to create such a condition where there is the contact of gear teeth, where the accuracy of this contact is determined by the dimensional accuracy of the rotating system and casing, these obtained by machining process.

3b. Problems identification: the constructive concept of the rotating system set based on the mandatory accuracy of gears teeth contact; impose a high level of machining rework to achieve the proper condition of contact between said teeth.

In turn, regarding the components in the helical gears and pinion component in the previous stage to the torque splitter a great difficulty in obtaining a mandatory self-centering of the torque splitter bi-helical pinion is observed.

Finally, the rotating system disassembly causes damage to the shaft gear pair, and torque splitting adjustment is made through axial advance of the bi-helical pinion of the torque splitter.

3c. Problems cause:

The constructive concept based on the fine adjustment between the gears teeth is a concrete fact that it does not provide the freedom degrees that allows adjustment between gears during the assembly, where this critical condition is enhanced by the fact that a check of the condition of teeth contact between gears only becomes possible to be performed during the assembly operation of the rotating system itself.

In turn, the difficulty of self-centering the torque splitter bi-helical pinion is explained by the fact that the configuration of the pinion and helical gear in the stage prior to the torque splitter transmits axial force to the bi-helical pinion shaft of the torque splitter, harming the self-centering thereof. In turn, the axial force is theoretically cancelled using bi-helical with different angles, but in practice other factors such as geometric errors, hamper the self-centering.

Add to that the fact that there is no high pressures oil injection system for disassembly and need for disassembly, will necessarily damage the gear or the shaft. The technique described for adjusting the torque split is more susceptible to human error and process errors, harming the proper torque split.

4. Hydraulic System of the Speed Reducer.

4a. Constructive concept: refers to a single system assembled in the "quadripartite" casing lower part;

4b. Problem identification: the tube structure of the lubricating system hampers the assembly and disassembly of the speed reducer, because limits the quadripartite casing parts motion;

4c. Problems cause: the tubes structure is very complex and stays in the inner components path during assembly and disassembly of the speed reducer rotating system.

5. Fixation System of the Speed Reducer to the Base

5a. Constructive concept: the reducer equipment is supported and fixed on a metallic base, which in turn is supported and fixed in the civil base. Therefore, there is an intermediate base between reducer and civil foundation.

5b. Problem identification: is evidenced a high time available for reducer installation in the concrete base, as well as once installed when in operational condition the speed reducer shows high vibration level.

5c. Problems cause: in the intermediate base there are more attachment elements (bolts, threaded bars, washers and nuts), increasing the assembly time, where in addition to its base stiffness is reduced by the existence of an intermediate metallic base, what takes place in higher vibration levels.

The inventor, aware of the restrictions resulting from operational, durability and reliability of the conventional speed reducer, proceeded to develop an inventive solution in the form of specific improvements in the specific constructive concept of the casing; in the assembly system of the casing; in the rotating system; in the hydraulic system and finally in the fixation system of the speed reducer in the industrial plant foundation, always bearing in mind to solve all problems causes evidenced in the art background topic.

Improvement Benefits:

In order for the new constructive provisions introduced in the subsystems listed as an object of functional and operational improvement, durability, reliability and macro economy in an industrial plant of organic or inorganic raw material processing (cement, minerals in general) can join to the inventive activity requirement under Article 8 of the Brazilian Industrial Property Law, differentials expected with the introduction of specific improvements shall be listed in specific subsystems considered, namely:

1. Reducer Casing:

Ensure greater durability to the casing, and thus delaying the need for replacement, with a consequent maintenance reduction of the speed reducer equipment;

Increase the casing stiffness, improving significantly the reducer reliability;

Ease the manufacturing and assembly.

2. Assembly System of the Casing:

Decrease the occurrence of fatigue fracture when the speed reducer equipment is in the field;

Increase the load capacity of the threaded bar component;

Eliminate reworks of machining;

Achieve a condition of more efficient teeth contact;

Lamination process gives more mechanical resistance to the threaded bar than the machining process. With that the fatigue limit and load transmission are increased;

Fine thread increases the contact area (greater number of threads per length unit) and increases the bar core diameter.

3. Rotating System of the Speed Reducer:

Ease finding ideal situation of the gear teeth contact for its gears;

Ensure the self-centering of the torque splitter bi-helical pinion component;

Ease the reducer equipment disassembly and improve the torque split adjustment;

4. Hydraulic System of the Speed Reducer:

Productivity gain (assembly cost reduction) when assembling without interfering with the rotating system;

Assembly and disassembly in shorter periods of time (productivity gain with cost reduction);

Human error reduction in the connection and disconnection of tubes/flanges

5. Fixation System of the Speed Reducer to the Base:

Reduced installation time of the reducer to the concrete base due to of the easiness of leveling and reduced amount of attachment elements (bolts, rods and nuts).

Vibration levels reduction in function of the proposed solution has greater attachment rigidity to the concrete base than the common solution.

Raw material cost reduction by not using the intermediate metallic structure.

Distinctive Characteristics

To make feasible the benefits listed and desired for the new constructive provision introduced to speed reducer equipment, the inventor introduced the following improvements:

1. Constructive provision introduced to speed reducer casing: now is composed of four pieces, or quadripartite, being three joint faces parallel passing through shafts center line, with the internal blocks elimination where bearing bores now is part of the casing component;

2. Assembly system of the casing: now is composed of threaded bar components, which in turn are assembled and fixed with spherical washer elements, particularly fine threads, obtained by cold lamination process instead of machining process.

Washers become composed of two parts, with the first part having a concave surface and the second part having a convex surface. The washer assembly is made by having the convex surface in contact with the concave surface, being that these surfaces are polished. When using this solution of composed washer, the casing deformation does not impose bending stress on the threaded bar, because the two washer surfaces move, absorbing the casing deformation.

3. Rotating system of the speed reducer: has now eccentric bushings (in the upper and lower intermediate shafts of the torque splitter) in both shafts of the torque split set which contain the pinions that will transmit torque to the output gear. In the stage previous to the torque split with pinion and gear components, being that the said gears now become to be formed of straight teeth as well as the pinions of the bi-helical torque splitter stage per se have the same helix angle. In turn from the perspective of the manufacturing of the gears, on the gears inner diameters are introduced hydraulic channels with the function of providing means to disassembly the gear from the shat and to ensure that all gear meshes are in contact in the torque split system.

The bushing component is a cylindrical piece where the inner and outer diameter centers do not coincide to each other, and its outer diameter slides regarding the bearing bore in the case of quadripartite casing.

From the assembly procedure point of view once found the adequate radial position of the bushing, the same is locked in its outer diameter regarding the casing bearing bore.

In turn, the eccentric bushing is used in the upper and lower shafts of the torque splitter to adjust the contact pattern of the pinions with the output gear.

The stage prior to torque split is provided with spur pinion and spur gear, where the torque splitter bi-helical pinion has the same helix angle.

It is further provided a channel made in the gear lateral side reaching the gear inner diameter, where there are circumferential channels on the gear inner diameter to distribute oil over its entire periphery. Oil is injected through these holes at high pressure in two occasions, namely:

when disassembly of the gear from the shaft is needed; and in the adjustment of the torque split.

The torque split adjustment is performed through the gears rotation until the two pinion flanks touches the two gear flanks. After that the hydraulic pressure is relieved and the assembly is obtained by interference fit between gear and shaft. With that, we have the perfect torque split.

4. Hydraulic system of the speed reducer: has now a modular and independent system, having four oil entrances, further having flanges, tubes and suchlike components, where each module is assembled to only one casing part as well as is dimensioned to meet the engineering specification for adequate lubrication and cooling of the rotating components enabling the rotating system kinematic.

5. Fixation system of the speed reducer to the base: now has seating plates for leveling, supporting and attaching the speed reducer to the industrial plant foundation.

Lead plates are installed directly on the concrete foundation. For leveling the plates the following procedure is followed: anchors are fixed to the plates (each plate is fixed with at least three anchors) with two nuts on each anchor, one at the lower part of the plate and another on the upper part of the plate, the set plate and anchors is positioned and pre-leveled on the primary concrete base; a thin layer of concrete is then used to pre-fix the anchors to the foundation; after curing this thin concrete layer the individual leveling is done in each plate with accuracy apparatus through threading nuts on the anchors positioned upwards or downwards causing a vertical movement of the plate in the need for leveling function, after leveling all the plates a secondary concrete (last layer) is applied.

With plates attached and leveled, the reducer is supported over the plates and fixed through threaded bars.

BRIEF DESCRIPTION OF THE DRAWINGS

Complementing the present description of the Specification and aiming at obtaining a better understanding of the characteristics of the present patent, a set of accompanying drawings is attached thereto representing one preferred application for the new constructive provision introduced to speed reducer equipment, where:

FIG. 9 is a representation in orthogonal cross detailed exploded view "of the detail shown in FIG. 7 of the gear component, evidencing its constructiveness in this region;

FIGS. 10A, 10B are representations in orthogonal cross longitudinal and elevation views of the leveling plate component, composing the improved attachment system of the speed reducer;

FIG. 21 represents an exploded side view of the improved casing claimed model.

DETAILED DESCRIPTION OF PREFERRED EMBODIMENTS

Figure 1:
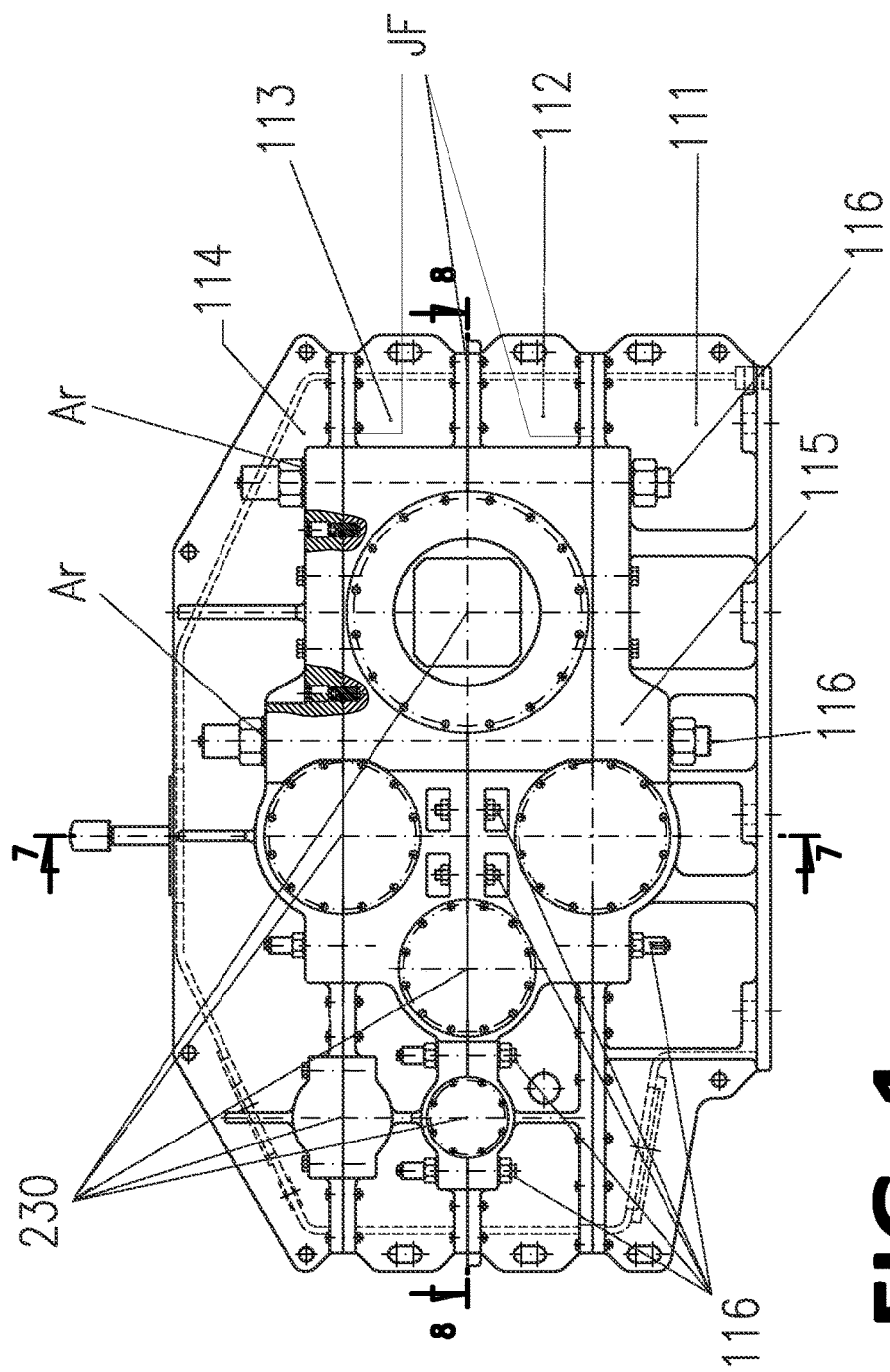
FIG. 1 is a representation in elevation view of the improved casing component, object of claim.

To facilitate an understanding of the principles and features of the various embodiments of the invention, various illustrative embodiments are explained below. Although exemplary embodiments of the invention are explained in detail, it is to be understood that other embodiments are contemplated. Accordingly, it is not intended that the invention is limited in its scope to the details of construction and arrangement of components set forth in the following description or examples. The invention is capable of other embodiments and of being practiced or carried out in various ways. Also, in describing the exemplary embodiments, specific terminology will be resorted to for the sake of clarity.

It must also be noted that, as used in the specification and the appended claims, the singular forms "a," "an" and "the" include plural references unless the context clearly dictates otherwise. For example, reference to a component is intended also to include composition of a plurality of components. References to a composition containing "a" constituent is intended to include other constituents in addition to the one named.

Also, in describing the exemplary embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other exemplary embodiments include from the one particular value and/or to the other particular value.

Similarly, as used herein, "substantially free" of something, or "substantially pure", and like characterizations, can include both being "at least substantially free" of something, or "at least substantially pure", and being "completely free" of something, or "completely pure".

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a composition does not preclude the presence of additional components than those expressly identified.

The materials described as making up the various elements of the invention are intended to be illustrative and not restrictive.

The following detailed description must be read and interpreted with reference to FIGS. 1 to 11, representing a preferred application form for the "improvements introduced to speed reducer equipment applied", not being intended to limit the invention scope, but limited only to the explained in the set of claims.

Constructive concept: The quadripartite casing (four parts) according to FIG. 1 is composed of lower (or first) casing 111, intermediate lower (or second) casing 112, intermediate upper (or third) casing 113 and upper (or fourth) casing 114, and three joint faces JF parallel and horizontal passing through the shafts center lines 230 of the rotating system of shafts. The main bearings are supported in the bearings block 115.

Figure 2:
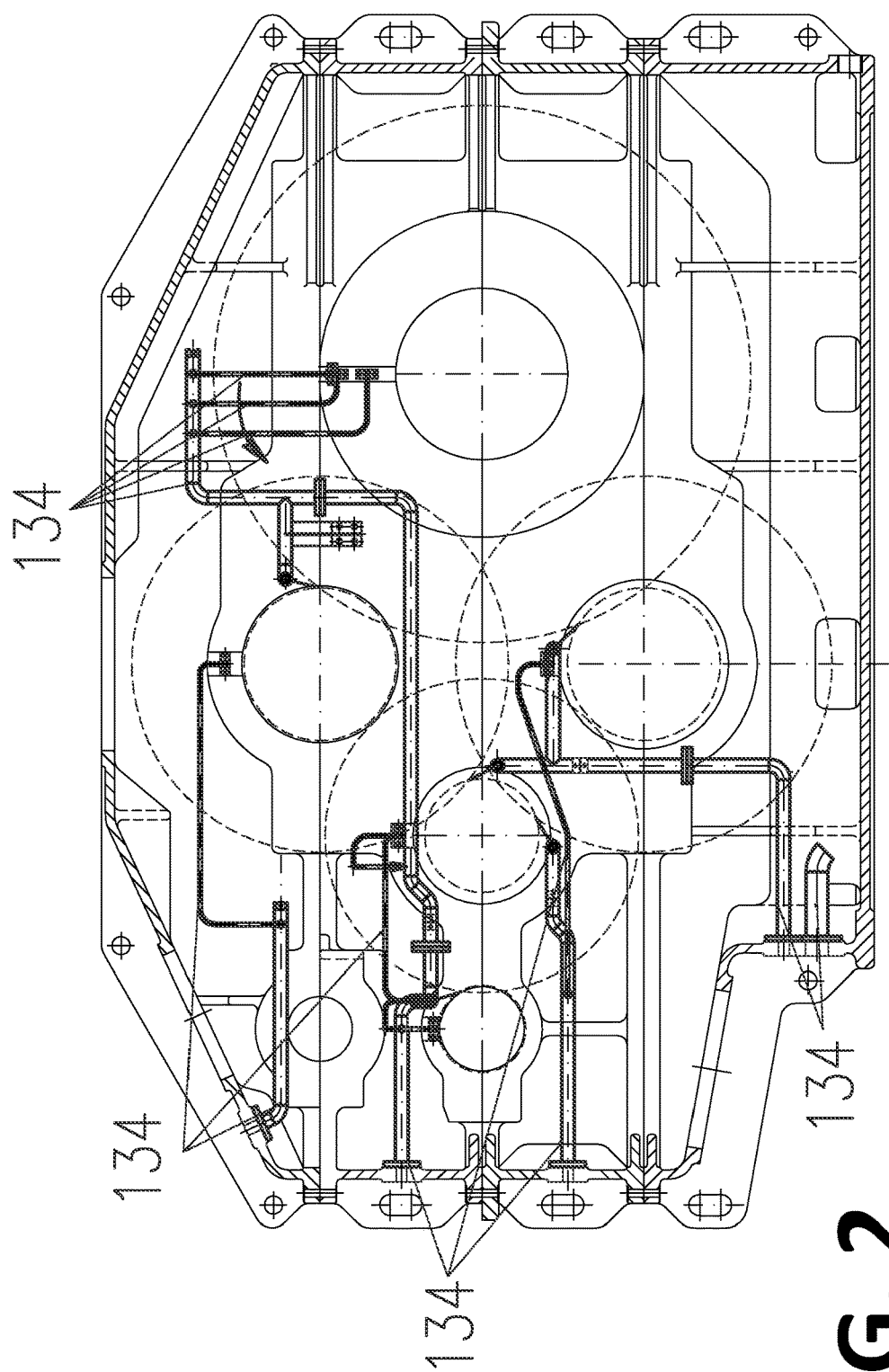
FIG. 2 is a representation in cross-section view of the speed reducer equipment receiving the claim object improvements; evidencing the four parts composing the improved casing.
Figure 3A:
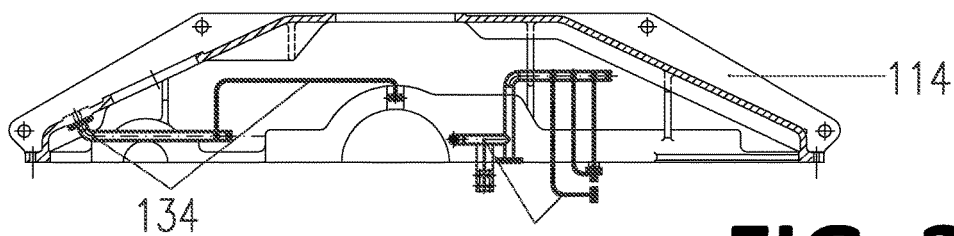
FIGS. 3A, 3B, 3C and 3D are representations in orthogonal cross view of the speed reducer equipment receiving the claim object improvements; evidencing the four parts composing the improved casing.
Figure 3B:
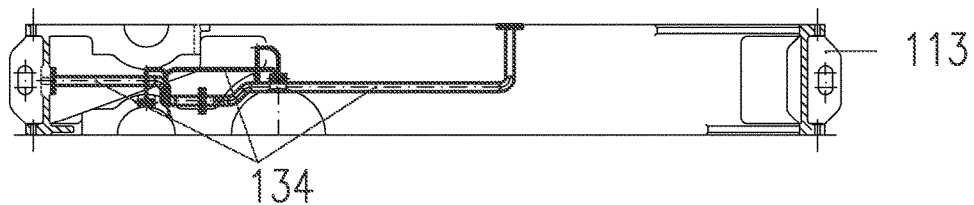
Figure 3C:
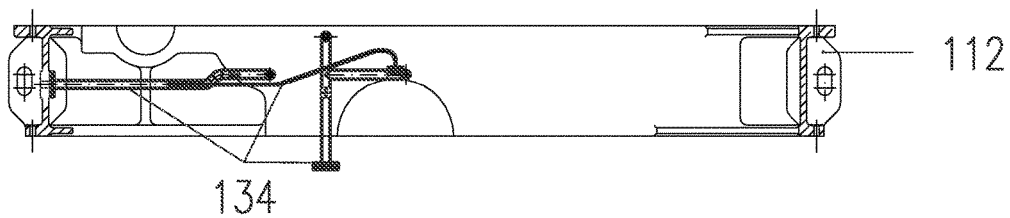
Figure 3D:
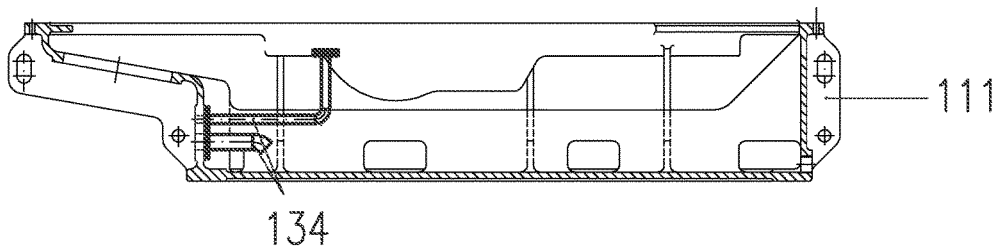

In turn, such as evidenced in FIGS. 2 and 3 respectively, the modular oil system 134, where in the FIG. 2 is disclosed the speed reducer with torque splitter assembled and in the FIG. 3 is disclosed the first through fourth casing parts 111, 112, 113 and 114, each with its respective modular oil system 134.

Figure 4:
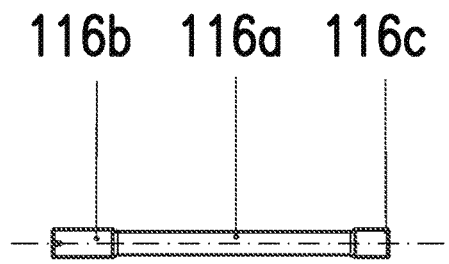
FIG. 4 is a representation in elevation view of the improved threaded bar component.

FIG. 4 shows the threaded bar 116 used, manufactured in high alloy steel benefited, with the two "fine" type threaded ends 116b and 116c obtained through cold-lamination, and the elongate body 116a with diameter slightly smaller.

Figure 5:
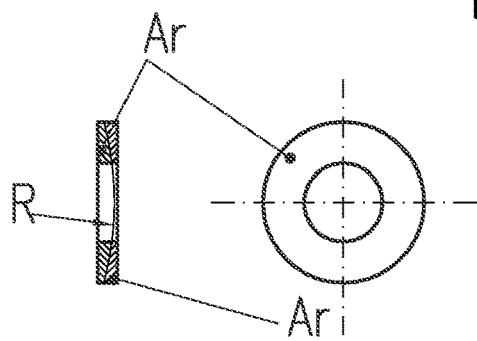
FIG. 5 is a representation in elevation and cross-section views of the improved pair of washer's component with spherical surfaces.

FIG. 5 shows the pair of washers Ar with spherical surfaces, manufactured in high alloy steel, where the two spherical surfaces are "polished" and have the same geometry and the same radius "R", however it is concave and the other is convex. Note in the FIG. 1 the installation place of the spherical pairs of washers Ar.

Figure 6:
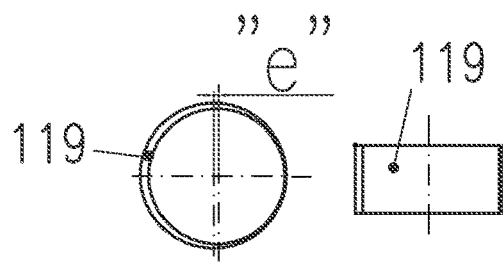
FIG. 6 is a representation in elevation view of the improved eccentric bushing component.

FIG. 6 shows the eccentric bushing 119 with eccentricity "e", being a piece manufactured in alloy steel, with cylindrical shape, being that, however the cylinder center lines lagged of eccentricity "e".

Figure 7:
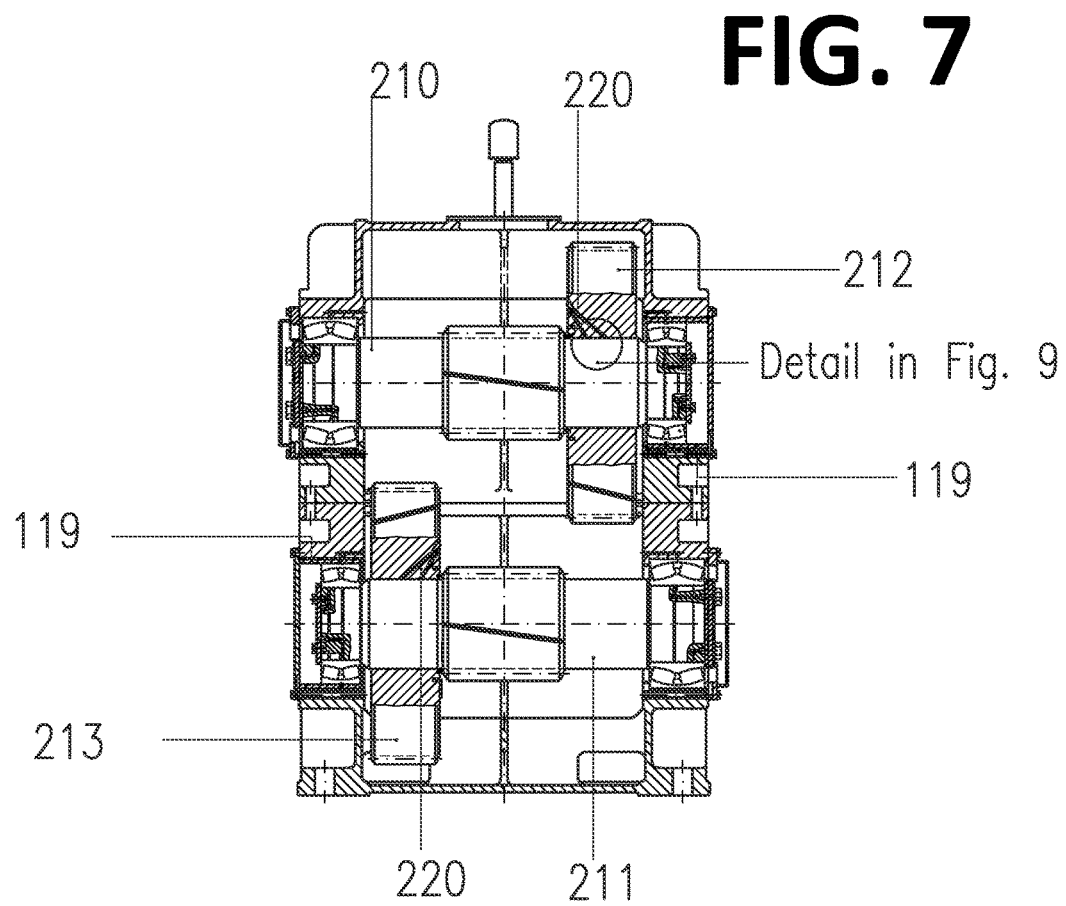
FIG. 7 is a representation in orthogonal cross view that shows a cut section of the improved casing component along the line 7-7 in FIG. 1.

FIG. 7 shows the use of two eccentric bushings 119 with eccentricity "e" in the bearing bores of the upper shaft 210 and of the lower shaft 211 of the "torque splitter".

It is important to highlight that FIG. 7 shows in the gear 212 and in the gear 213 machined holes and channels known as high pressure oil injection system.

In the FIG. 9 the high pressure oil injection system is shown in details. It is possible to note that through the holes 222 machined in the gear body side, being that each hole meets the gear inner diameter in the inner circular channel 224, it is possible to inject oil in high pressure, and due to the oil film 228 which is formed between the gear and the shaft the gear inner diameter 226 allowing the gear slippage (rotating movement) on the shaft. This slippage is useful to disassemble the gear from the shaft and to ensure that the pinion 226 is in contact with the gear 219 at the same time as the left helix pinion 215 and the right helix pinion 216 are in contact with the gear 212 and an inlet pinion shaft 214 is in the central position in relation to the casings 112 and 113.

Figure 8:
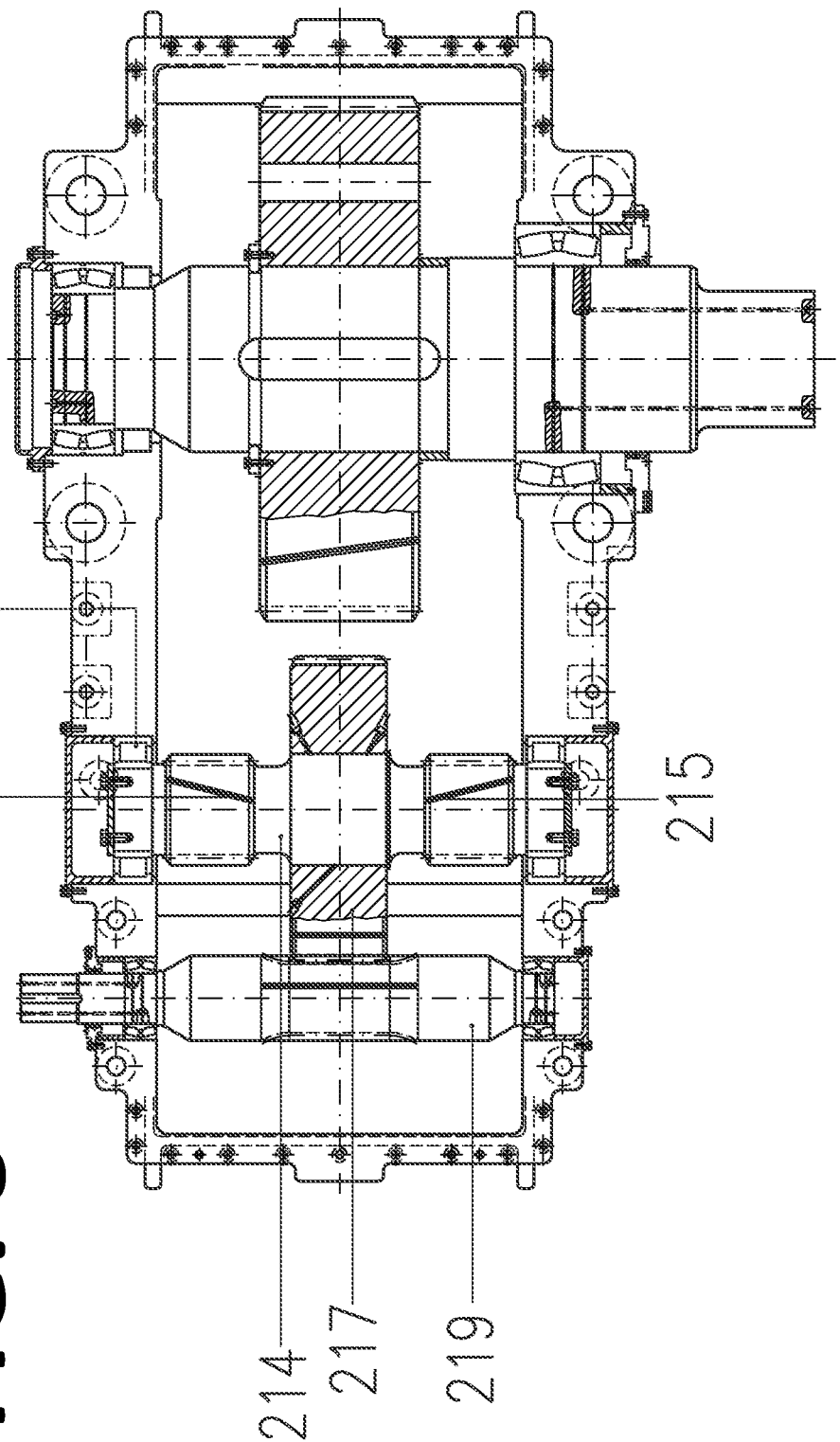
FIG. 8 is a representation in orthogonal cross view that shows a cut section of the improved casing component along the line 8-8 in FIG. 1.

FIG. 8 shows the constructive form of the inlet pinion shaft 214 of the torque splitter, that is manufactured in forged steel, with two identical helical teeth milled in the shaft, being the only difference the helix direction, being one left helix pinion 215, while the other is right helix pinion 216. Between these two helical pinions 215, 216 a spurs gear 217 is assembled.

The other characteristic is that the inlet pinion shaft 214 of the torque splitter is supported by cylindrical roller bearings 218, which do not restrict the shaft axial displacement, where in the FIG. 8 can be characterized that the engaging stage previous to the torque splitter, is constituted of a spurs pinion shaft 219 and spurs gear 217.

FIG. 10 illustrates representative examples of one of the eight leveling plates 221 manufactured in structural carbon steel machined with "special characteristics": surface finishing of 3.2 µm of roughness "Ra" on the surface 221a, and flatness tolerance on this same surface 221a of 0.02 mm.

Figure 11:
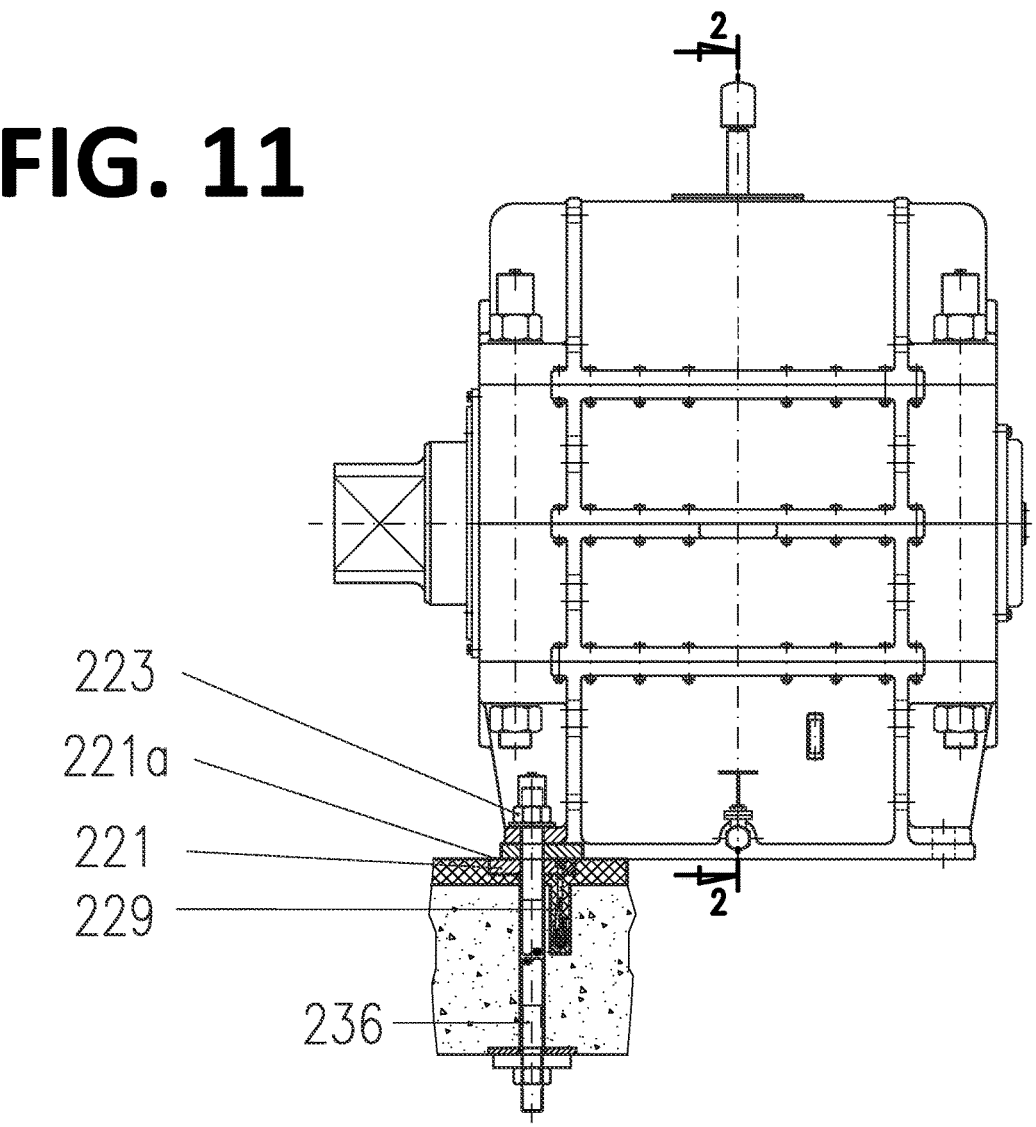
FIG. 11 is a representation in elevation view of the speed reducer installed, evidencing details of how the speed reducer with torque splitter is attached to its base.
Figure 12:
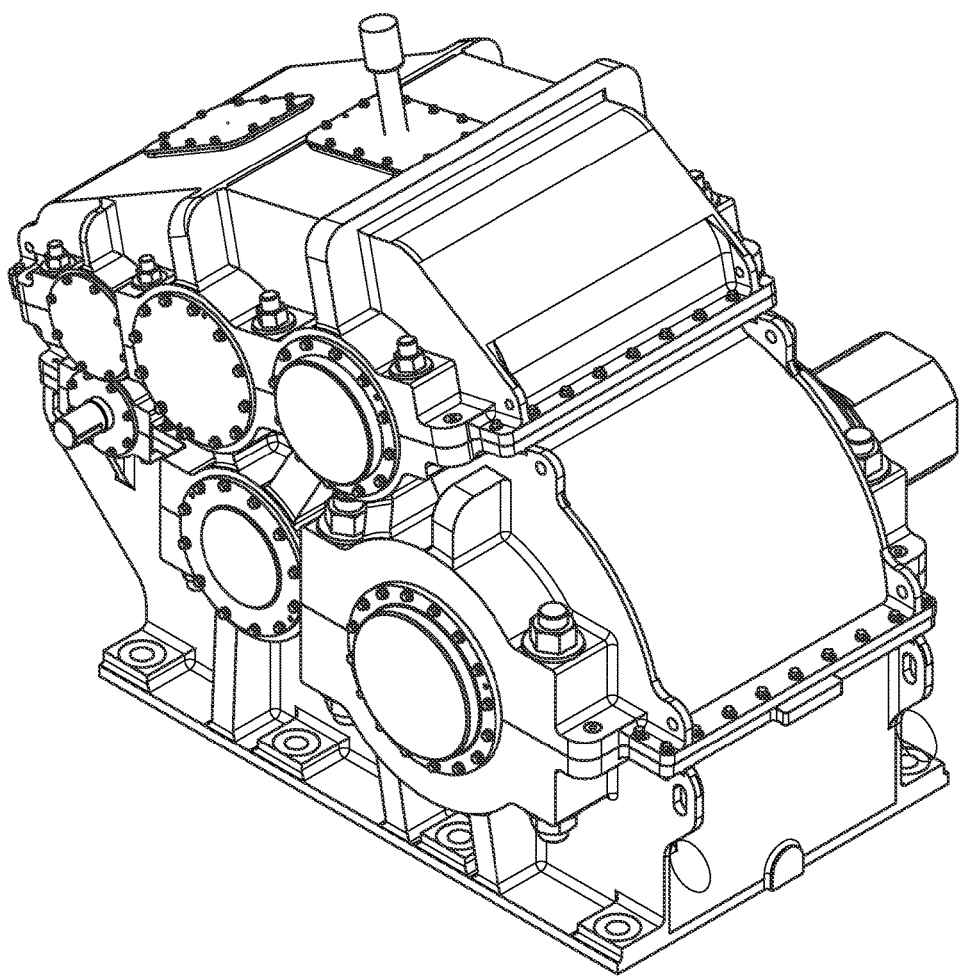
FIG. 12 represents a front perspective view of the speed reducer equipment model with the improved casing claimed.
Figure 13:
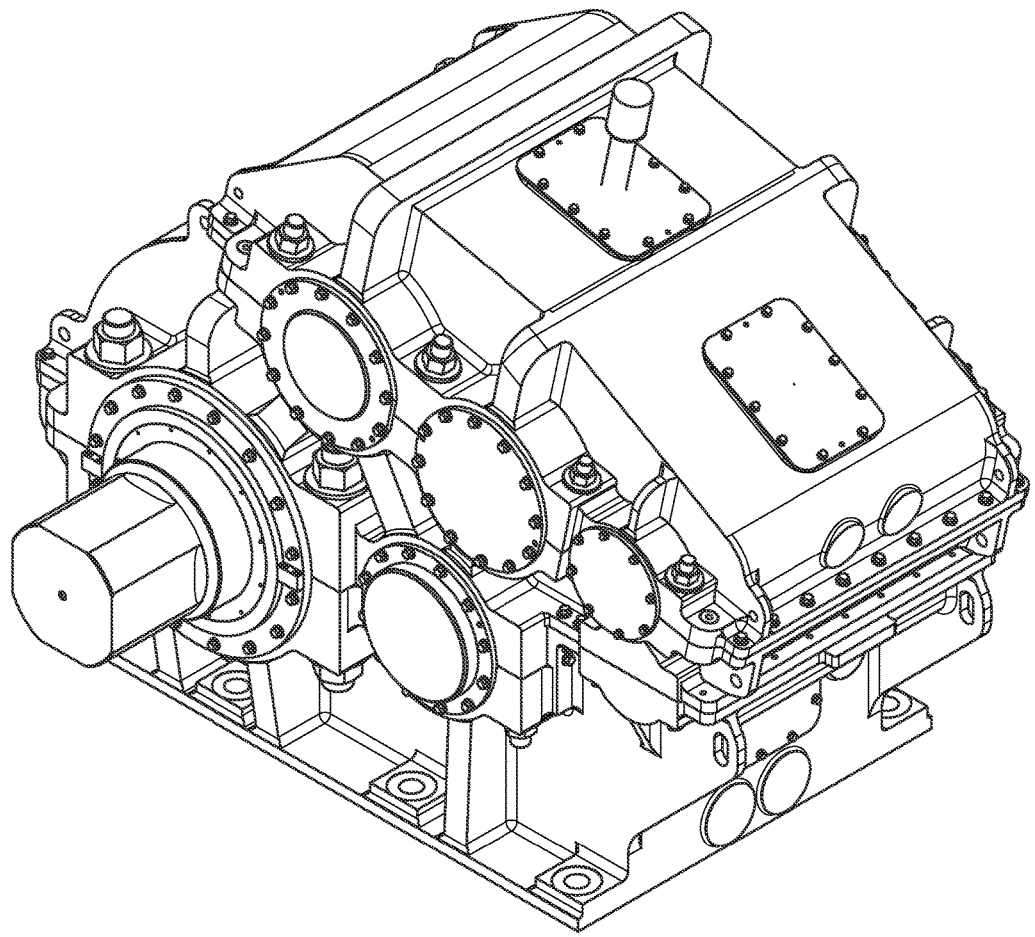
FIG. 13 represents a subsequent perspective view of the speed reducer equipment model with the improved casing claimed.
Figure 14:
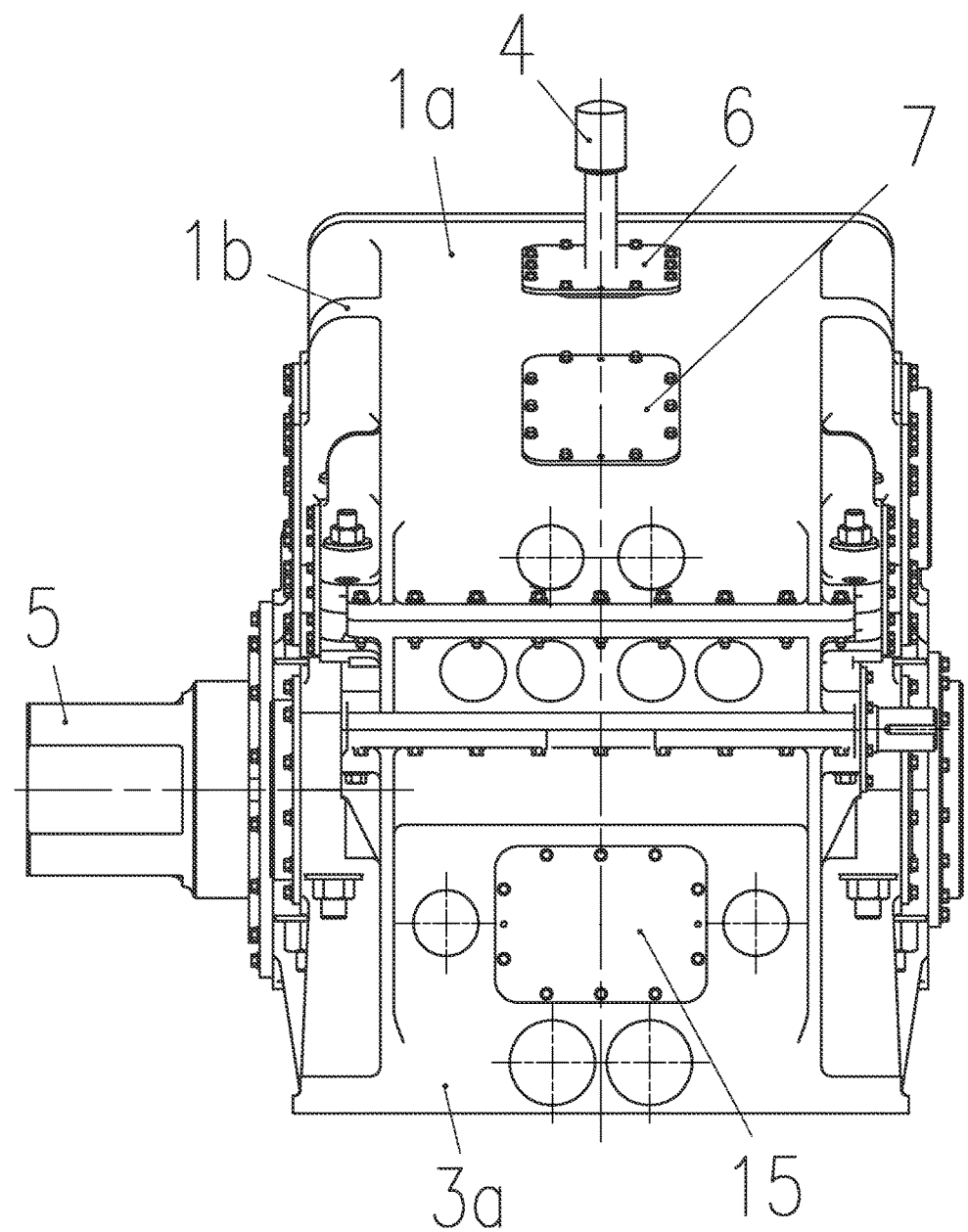
FIG. 14 represents a subsequent view of the speed reducer equipment model with the improved casing claimed.
Figure 15:
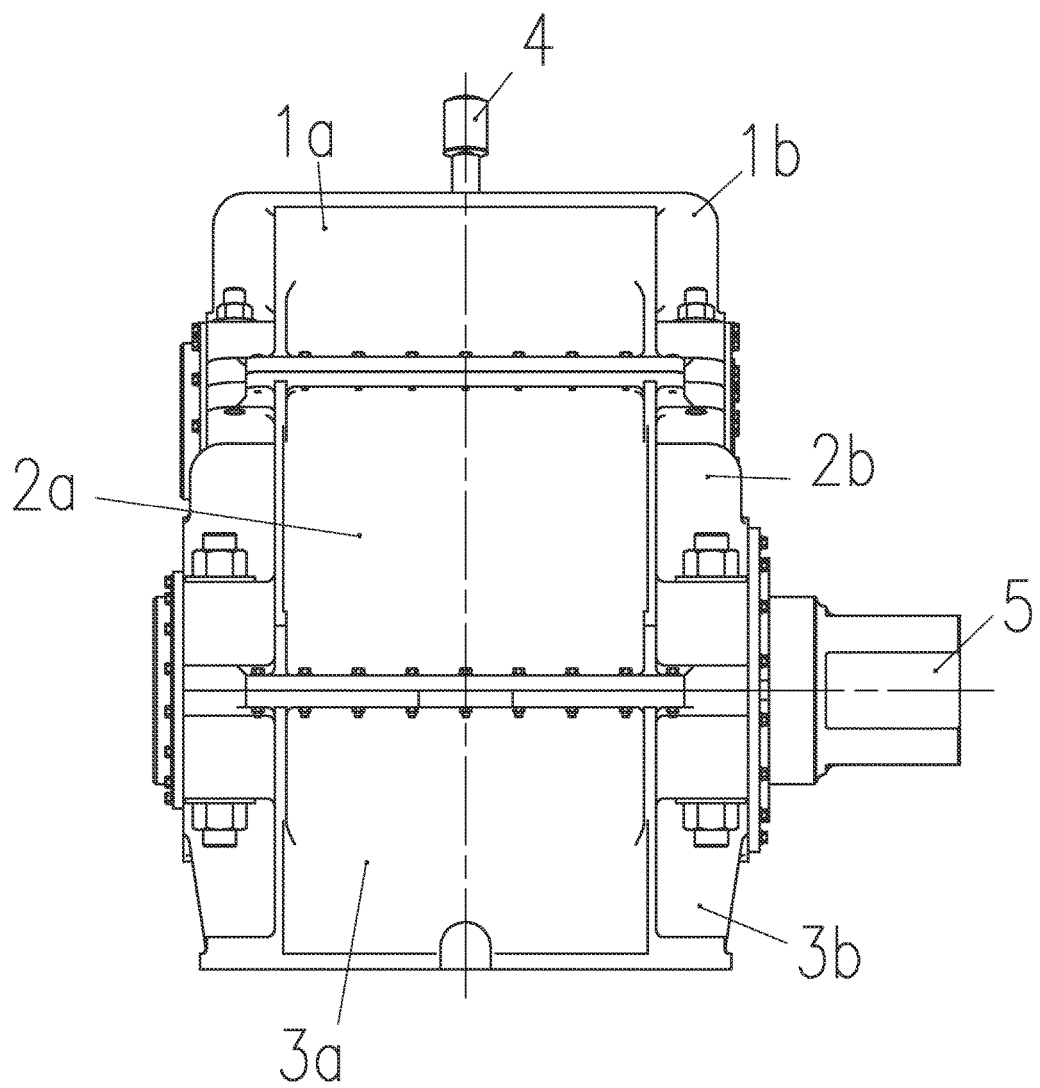
FIG. 15 represents a front view of the speed reducer equipment model with the improved casing claimed.
Figure 16:
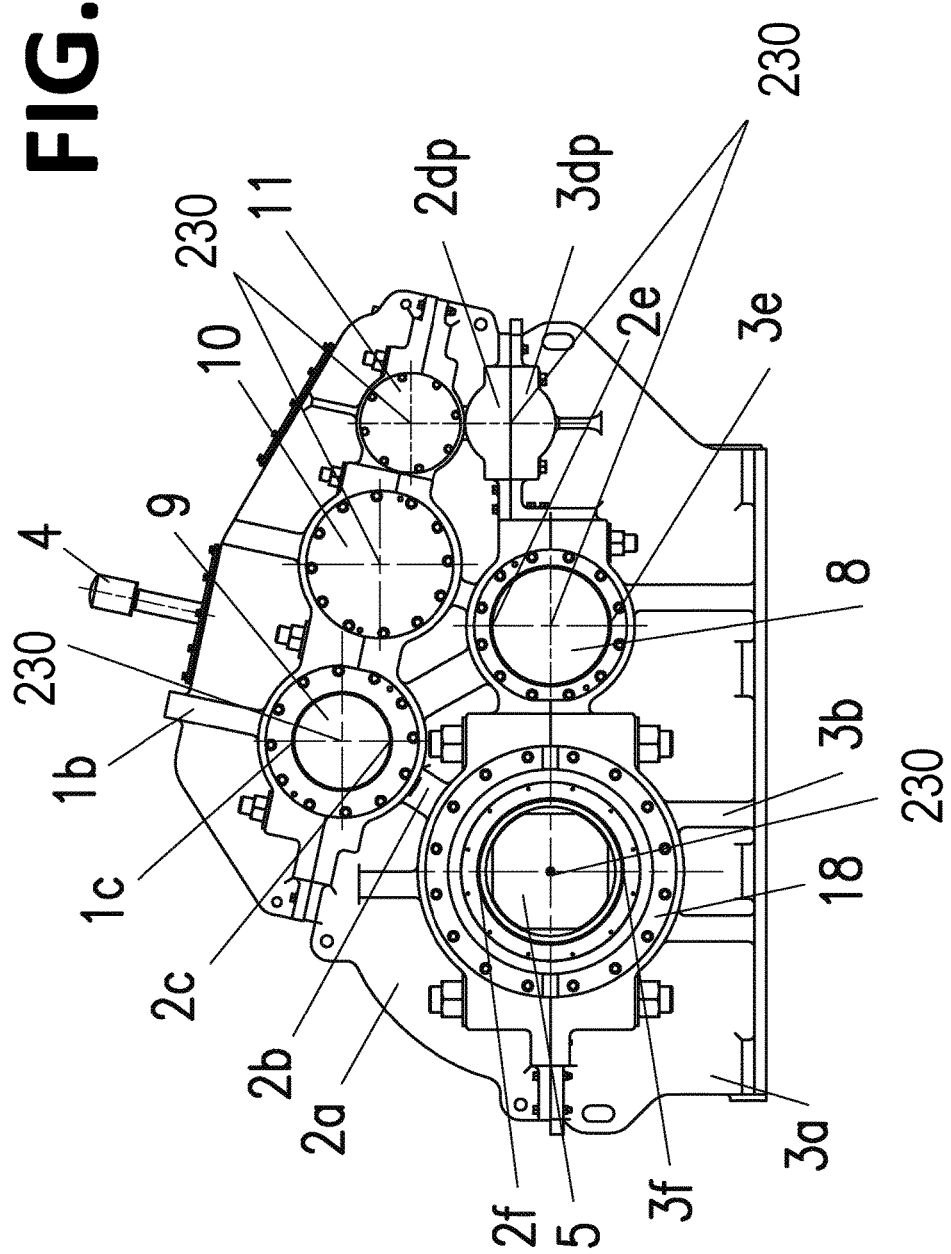
FIG. 16 represents a side view of the speed reducer equipment model with the improved casing claimed.
Figure 17:
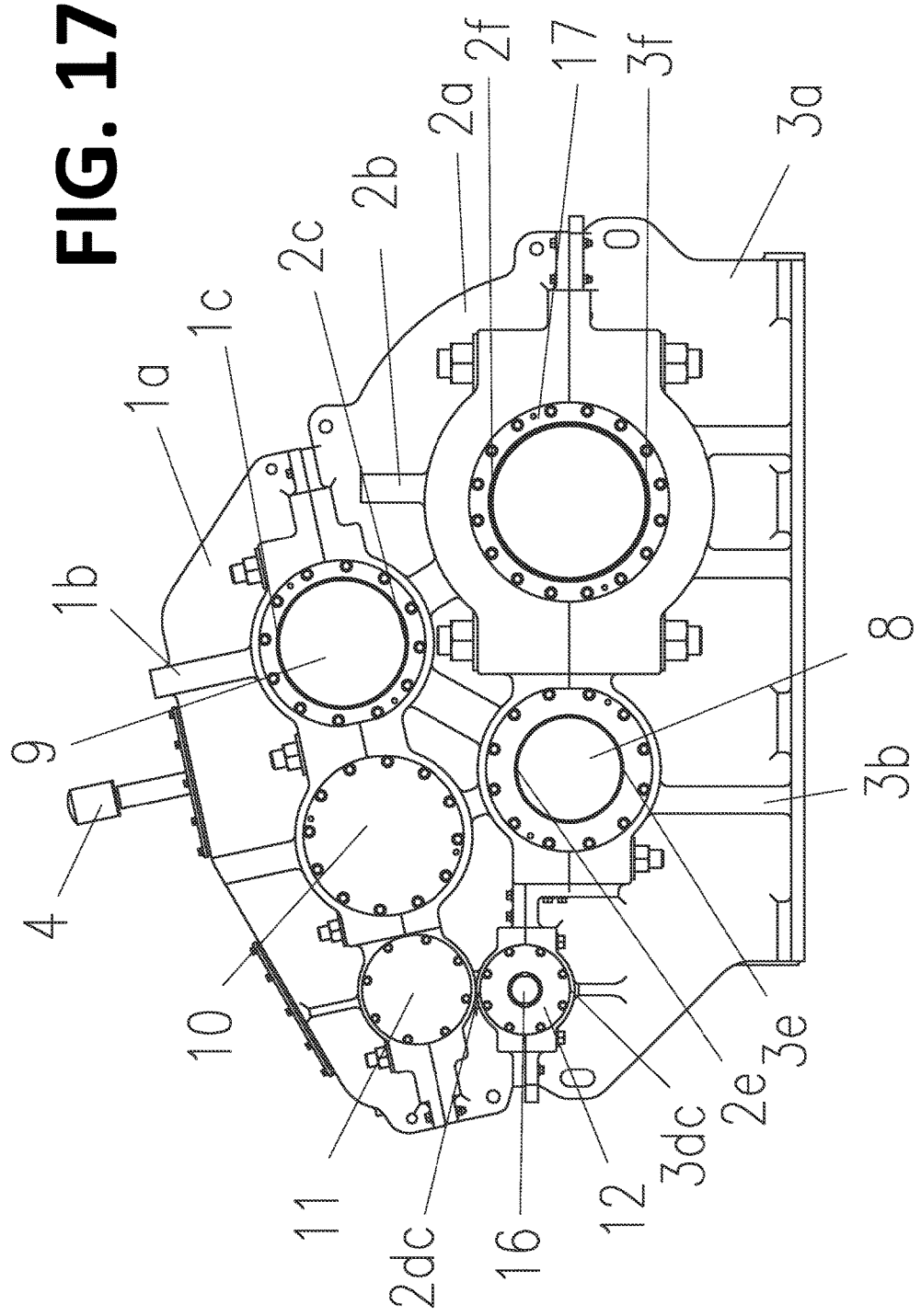
FIG. 17 represents another side view of the speed reducer equipment model with the improved casing claimed.

FIG. 11 shows details of how the speed reducer with torque splitter is fixed to its base. The purpose of these "special characteristics" mentioned above is ensuring that, when the pieces are fixed on the concrete base with the surface 221a upwards, through anchors 229 according to standard DIN 529, and supported in the nuts 223 of the anchor, an admissible leveling error among the eight leveling plates is obtained (measured with a laser leveling instrument). This accurate leveling ensures an adequate distribution of the speed reducer with torque splitter weight in its base, through eight leveling plates 221. The speed reducer fixation to the base is performed through threaded bars 236.

The following detailed description must be read and interpreted with reference to FIGS. 12 to 21, representing a preferred application form for the "improvement introduced in casing applied to speed reducer equipment", not being intended to limit the invention scope, but limited only to the explained in the set of claims.

Constructive concept: such as shown through FIGS. 1 to 10, the reducer equipment shows the casing subsystem composed by:

1. Upper casing 1 formed by a cast iron or steel body 1a which vertical walls are flat, being two lateral, a left and a right, provided with a lower closing rim Af1 leaned regarding the surface 3g and defined in all the contour of the lower part of 1. The sidewalls show reduced thickness, being that on its external surfaces are defined ribs 1b, which function is increase the structural rigidity, and along the closing rim in these same lateral is defined a set of three cavities 1c, see FIGS. 20 and 21, each one in the circumference arc shape, which function is house and support the reducer roller bearings.

Figure 18:
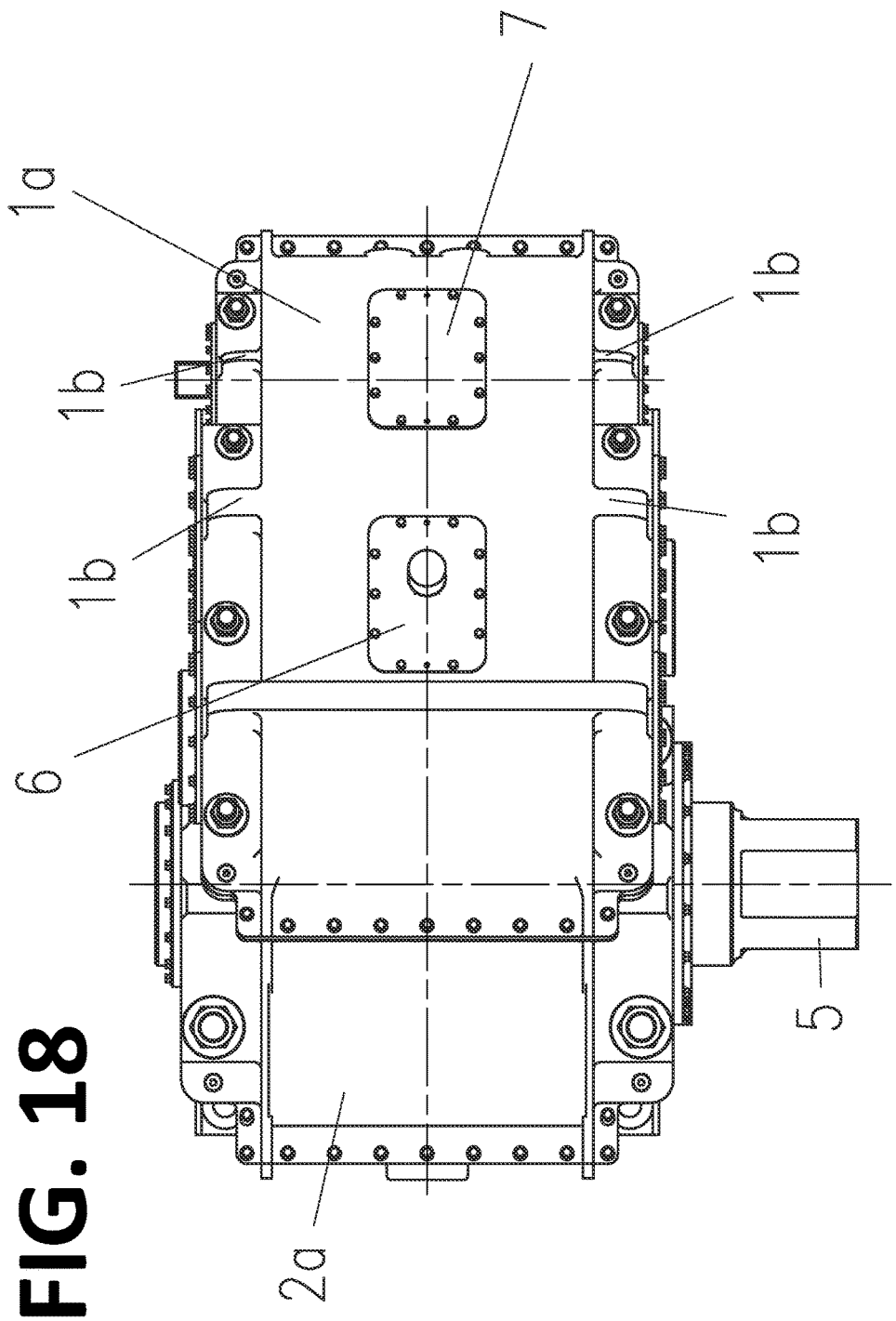
FIG. 18 represents an elevation view of the speed reducer equipment model with the improved casing claimed.
Figure 19:
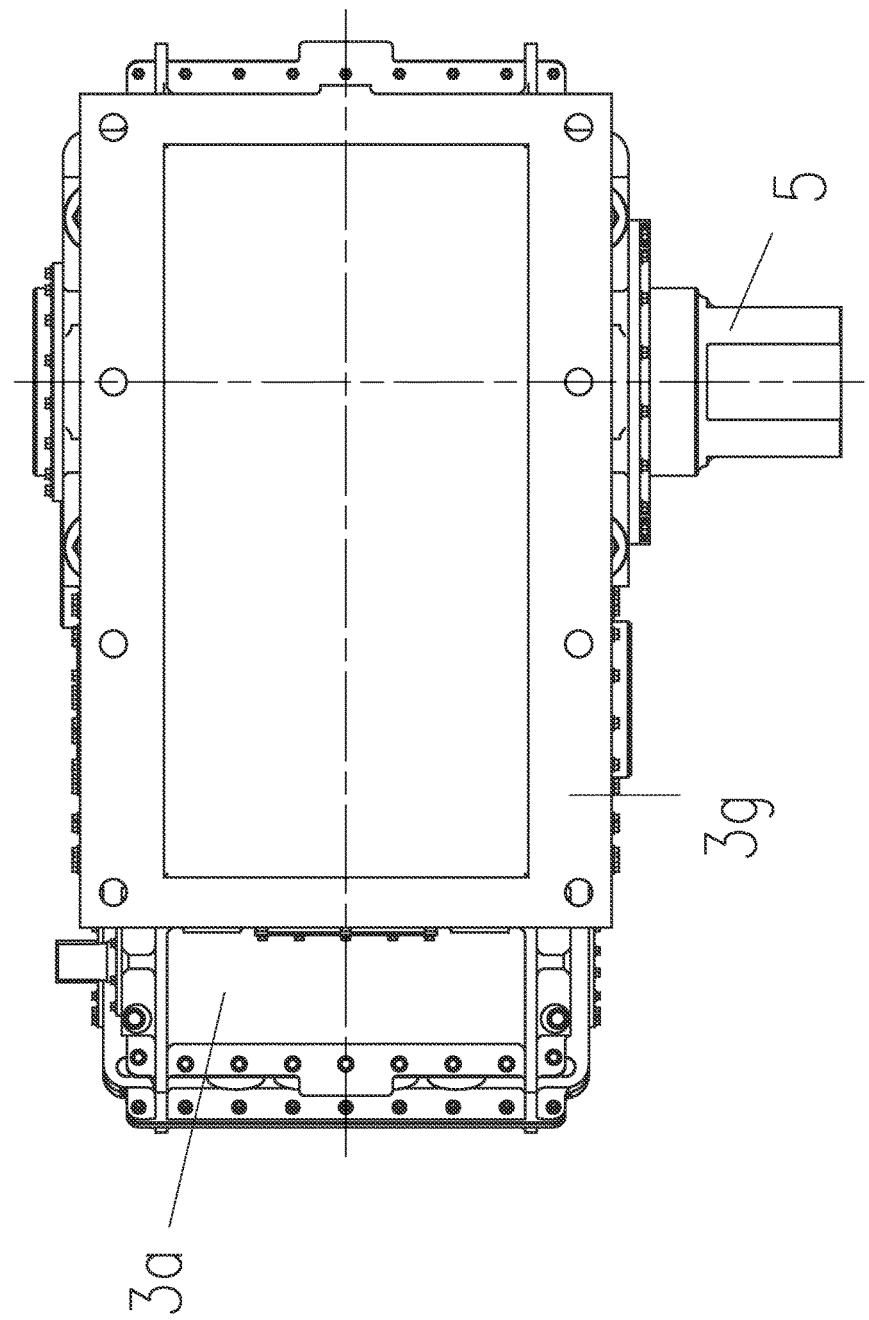
FIG. 19 represents a lower view of the speed reducer equipment model with the improved casing claimed.
Figure 20:
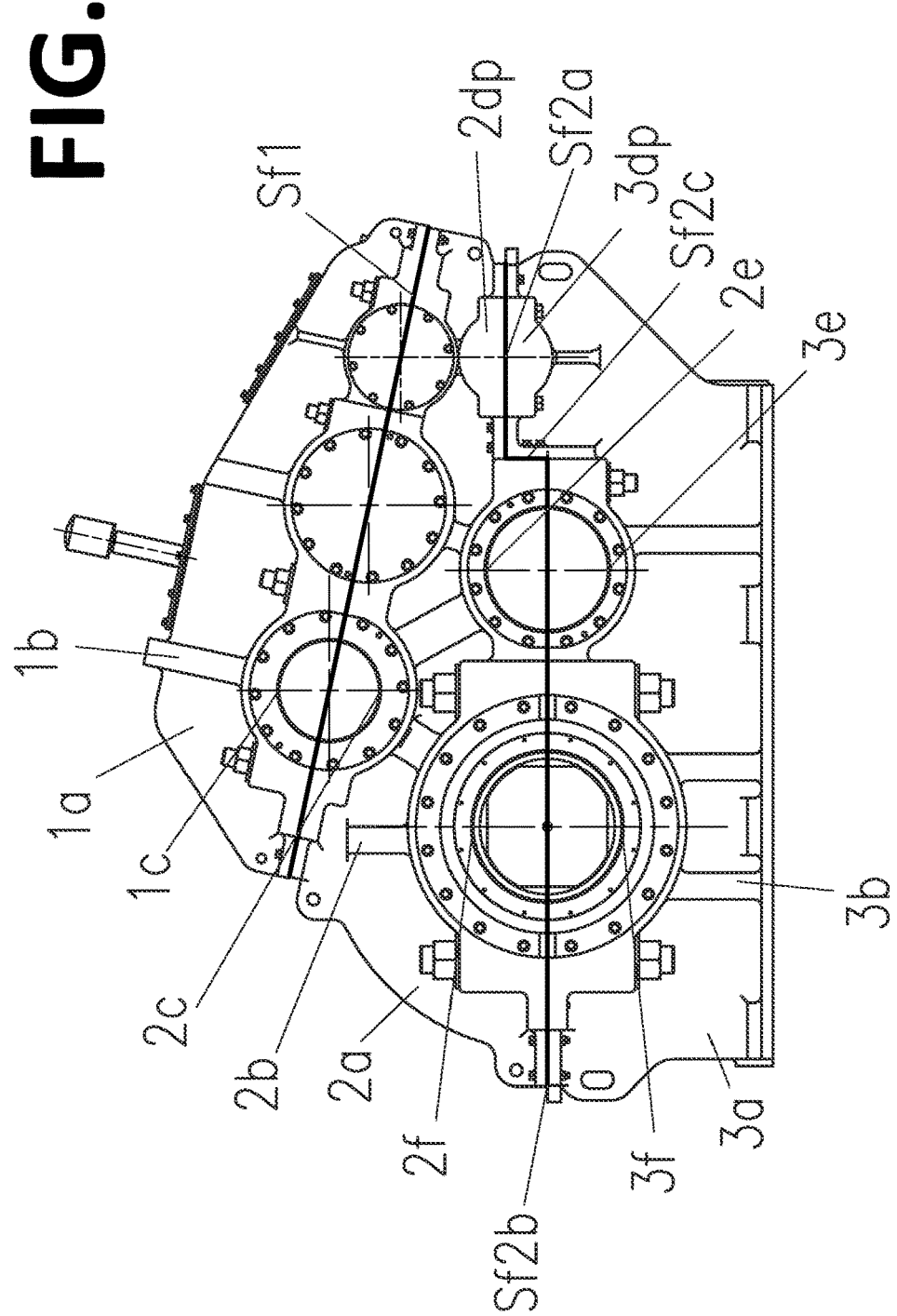
FIG. 20 represents a side view of the improved casing claimed model.

In turn, its upper face is defined by two planes in angle to each are attached lids 6 and 7, see FIG. 18, where in particular it is assembled an orthogonal and central position to the lid 6, a breather 4 with a filter, which function is allow the internal cavity pressure equalization with the external environment. Such breather can be alternatively installed on the lid 7.

2. Intermediate casing 2: has defined a body 2a composed of flat vertical walls, being two lateral, a left and a right, being that along these is defined a plurality of ribs 2b, limited by body upper and lower ends 2a.

In the body upper end 2a is defined a closing rim Af2 developing in all the body contour 2a where along this closing rim is defined a set of three cavities 2c, see FIGS. 9 and 10, each in the form of circumference arc, which function is house and support the reducer roller bearings. In this case is especially relevant the fact that the closing rim Af2 shows identical geometry to the closing rim Af1 of the upper casing 1, as well as three cavities 2c are complementary of the three cavities 1c.

In the body lower end 2a are defined two closing rims Af3a and Af3b parallel and vertically spaced to each other, developing in all the body lower contour 2a, where to these are defined a small cavity 2dc (the cavity can be replaced by a protrusion 2dp if it is not necessary support for bearing in this region), a middle cavity 2e and a greater cavity 2f, all with circumference arc, which function is house and support the roller bearings of the rotating system.

3. Lower casing 3: has defined a body 3a provided with flat vertical walls, being two laterals, one left and one right, being that along these is defines a plurality of rims 3b, limited by body upper and lower ends 3a, where in its upper end are defined two closing rims Af4a and Af4b parallel and vertically spaced to each other, developing in all the body upper contour 3a, where from these are defined a small cavity 3dc (the cavity can be replaced by a protrusion 3dp if it is not necessary support for bearing in this region), a middle cavity 3e and a greater cavity 3f, all with circumference arc, which function is house and support the roller bearings of the reducer. In this case is especially relevant the fact that the closing rims Af4a and Af4b show identical geometry of those closing rims Af3a and Af3b, respectively, of the intermediate casing 2, as well as the cavity 3dc or small protrusion 3dp, the middle cavity 3e and the greater cavity 3f are cavity complementary 2dc or of the small protrusion 2dp, of the middle cavity 2e and of the greater cavity 2f, respectively. In addition to the body lower end part 3a is defined a plan base 3g, as well as in its posterior face a lid 15 is attached.

Improved Casing Assembly:

a. Preliminarily in the lower casing interior 3 is assembled part of the rotating system and part of the roller bearings, where specifically the output shaft 5 bearing is assembled overlapping the greater cavity 3f, see FIGS. 5 and 6 respectively;

b. An intermediate casing 2 is positioned and aligned on the lower casing 3, such that the greater cavity 3f stays aligned with the greater cavity 2f, as well as the closing rims Af3a and Af3b are positioned adjacent to the closing rims Af4a and Af4b, respectively;

c. The attachment between the lower casing 3 and the intermediate casing 2 is made by applying a plurality of attachment elements (bolts, nuts and pins), in all closing rims contour Af3a and Af4a, and Af3b and Af4b, respectively;

d. The rotating system remaining is assembled and supported by an intermediate casing 2;

e. The upper casing 1 is positioned and aligned on the intermediate casing 2, such that the closing rim Af1 is positioned adjacent to the closing rim Af2;

f. The attachment between the intermediate casing 2 and the upper casing 1 is made by applying a plurality of attachment elements (bolts, nuts and pins), in all closing rims contour Af1 and Af2;

g. Application of plates and lids:

in the cavities joint region 1c and 2c are installed in both sides of the circular lids reducer 9, 10 and 11 that are attached through a plurality of attachment elements (bolts);

in the constructive variation wherein the inlet shaft 16 is located in the cavities joint region 2dc and 3dc and where only a bearing for the shaft is supported in the casing side and outer face (the other bearing is supported internally to the casing), a circular lid 12 is used and attached by a plurality of attachment elements (bolts) in the cavities joint region 2dc and 3dc, that remains at the same inlet shaft side 16, and in the side opposite to the inlet shaft 16 has a protrusion defined by 2dp and 3dp;

in the constructive variation wherein the inlet shaft 16 is located in the cavities joint region 2dc and 3dc and where both bearings for the shaft are supported in the side faces and external to the casing, two circular lids are used (one in each reducer side), being that the lid 12 used at the same side of the inlet shaft has central hole for shaft passage, and the lid used in the side opposite to the inlet shaft does not have a central hole. The lids are then attached to the casing by a plurality of attachment elements (bolts);

in the constructive variation wherein the inlet shaft 12 is located in the cavities small joint region 1c and 2c, then, both sides of the reducer have the protrusion defined by 2dp and 3dp (in replacement to the cavities 2dc and 3dc), and in this way the lid 12 is not used, and the lid 11 in the reducer side containing the inlet shaft 16 is characterized by having a central hole for the shaft passage;

in the medium cavities joint region 2e and 3e are installed in both sides of the reducer circular lids 8, where in the peripheral region of this lid outer diameter is defined a plurality of attachment elements (bolts);

in the greater cavities joint region 2f and 3f in the side opposite to the output shaft 5 is attached a circular lid 17, where in the peripheral region of this lid outer diameter is defined a plurality of attachment elements (bolts). In the same side of the output shaft 5 is installed a two-part lid 18 where in all its contour is also defined a plurality of attachment elements (bolts).

The choice of the preferred application for improvements introduced in constructive concept of the casing; in the assembly system of the casing; in the rotating system; in the hydraulic system and finally in the attachment system of the speed reducer in the industrial plant foundation, claim object of this record, described in this topic detailing the invention, is provided only as an example. Changes, modifications and variations can be made for any other application for the improvements claimed, disclosed and cited by those skilled in the art without however differ from the object disclosed in the application of the present invention, which is defined solely by the appended claims.

It is substantiated by what has been described and illustrated that the "IMPROVEMENT INTRODUCED TO SPEED REDUCING EQUIPMENT WITH TORQUE SPLITTER, AND CASING THEREOF" thus claimed meet the standards governing the patent in light of the Industrial Property Law, deserving by what was exposed and as a consequence, the respective privilege.

The invention claimed is:

1. A speed reducer with torque splitting comprising:
a casing comprising three overlapping metallic casing parts having holes: first, second and third metallic casing parts, each presenting vertical walls provided with ribs;
roller bearings disposed in the holes of the casing parts; and
rotatable shafts contained within the casing, each rotatable shaft having a shaft center line being the axis of rotation of the shaft;
the speed reducer attached to a foundation surface;
wherein one of the rotatable shafts is an inlet pinion shaft with two dentates, each dentate has a helix direction different from one another;
wherein the closing between the first and second casing parts forms an inclined planar surface with regard to the foundation surface;
wherein the closing between the second and third casing parts is formed by three planar surfaces, two of which are parallel with the foundation surface, and the other of which is orthogonal with the foundation surface; and
wherein each shaft center line lies on one of:
the inclined planar surface between the first and second casing parts; and
the two planar surfaces between the second and third casing parts parallel with the foundation surface.

2. The speed reducer of claim 1 further comprising a modular oil system.

3. The speed reducer of claim 1 further comprising alloy steel rods, each rod comprising an elongate body with a diameter smaller than each end of a rod, the ends of each rod comprising threads.

4. The speed reducer of claim 1 further comprising a pair of alloy steel washers with spherical surfaces having the same geometry and the same radius, wherein one surface is concave and the other surface is convex.

5. The speed reducer of claim 1 further comprising steel alloy, cylindrical shaped eccentric bushings, each with an eccentricity, wherein a cylinder center line of each bushing is lagged of the eccentricity.

6. The speed reducer of claim 1 further comprising a hydraulic sack allowing a pressure oil injection, including holes in a gear body side, wherein each hole meets a gear inner diameter in an inner circular channel, enabling an oil film formation, and allowing the slippage of a gear on one of the rotatable shafts.

7. The speed reducer of claim 1 further comprising leveling plates having a surface roughness equal or smaller than 3.2 μm.

8. A speed reducer with torque splitting comprising:
a casing assembly comprising four casings and three joint faces, attachment rods and spherical washers;
rotatable shafts contained within the casing assembly, each rotatable shaft having a shaft center line being the axis of rotation of the shaft;
a modular hydraulic system comprising four modules, one each for only one of the casings; and
an attachment system for attaching the speed reducer to a foundation surface;
wherein one of the rotatable shafts is an inlet pinion shaft with a spur gear located between two dentates, wherein the two dentates of the inlet pinion shaft transfer torque to two other of the rotatable shafts at the same time, and in order to divide the torque, each dentate has a helix direction different from one another; and
wherein the four casings comprise four metallic overlapping casings having one of the three joint faces between each of the overlapping casings, a first joint face between a first casing and a second casing, a second joint face between the second casing and a third casing, and a third joint face between the third casing and a fourth casing, the three joint faces parallel and passing through shaft center lines, the casings assembled and fixed via the attachment rods and spherical washers.

9. The speed reducer of claim 8, wherein at least one attachment rod of the attachment rods of the casing assembly comprises an alloy steel rod with an elongate body between two ends, with the elongate body having a diameter smaller than each end, the ends comprising threads.

10. The speed reducer of claim 8, wherein the washers are alloy steel washers with spherical surfaces, one surface is concave and the other surface is convex.

11. The speed reducer of claim 8 further comprising steel alloy, cylindrical shaped eccentric bushings, each with an eccentricity, wherein a cylinder center line of each bushing is lagged of the eccentricity.

12. The speed reducer of claim 8 further comprising an hydraulic sack in a helical gear allowing a pressure oil injection, including holes in a gear body side, wherein each hole meets a gear inner diameter in an inner circular channel, enabling an oil film formation, and allowing the slippage of the helical gear on one of the rotatable shafts.

13. The speed reducer of claim 8, wherein the attachment system comprises carbon steel leveling plates having a surface roughness equal or smaller than 3.2 μm and a maximum flatness tolerance in the same surface of 0.02 mm.

14. The speed reducer of claim 8, wherein the casings present vertical walls provided with ribs.

15. The speed reducer of claim 8, wherein in order to equally divide the torque, the dentates are milled in the inlet pinion shaft, the dentates identical to one another except each having a helix direction different from one another.

* * * * *